United States Patent [19]

Peeters

[11] Patent Number: 5,386,943
[45] Date of Patent: Feb. 7, 1995

[54] ALL PURPOSE V-SHAPED MANURE SPREADER

[75] Inventor: Kenneth J. Peeters, Bear Creek, Wis.

[73] Assignee: H & S Manufacturing Co., Inc., Marshfield, Wis.

[21] Appl. No.: 919,363

[22] Filed: Jul. 23, 1992

[51] Int. Cl.⁶ .................. A01C 15/00; A01C 23/00
[52] U.S. Cl. .................... 239/675; 239/662; 239/676; 239/680; 239/123; 198/497; 222/342; 366/309
[58] Field of Search ............... 239/662, 663, 670, 675, 239/676, 679–681, 123, 120, 104; 366/603, 193, 192, 309, 71; 198/494, 497, 498; 222/148, 342, 236, 227, 412

[56] References Cited

U.S. PATENT DOCUMENTS

| | | | |
|---|---|---|---|
| 861,981 | 7/1907 | Hill | 198/497 |
| 1,820,528 | 8/1931 | Claar | 239/680 |
| 1,856,417 | 5/1932 | Hyland | 239/676 |
| 1,974,128 | 9/1934 | Thompson | 198/497 |
| 2,702,711 | 2/1955 | Purcell | 239/680 |
| 2,891,655 | 6/1959 | Saiberlich | 239/675 |
| 3,076,654 | 2/1963 | Colwill et al. | 239/679 |
| 3,185,449 | 5/1965 | Kasten | 198/498 |
| 3,298,695 | 1/1967 | Brackbill et al. | 239/680 |
| 4,069,982 | 1/1978 | Brackbill | 239/679 |
| 4,219,163 | 8/1980 | Hale et al. | 239/662 |
| 4,619,405 | 10/1986 | Linde | 239/675 |
| 5,052,627 | 10/1991 | Balmer | 239/676 |

FOREIGN PATENT DOCUMENTS

173886 2/1953 Germany.
2235117 2/1991 United Kingdom ............... 239/662

Primary Examiner—Karen B. Merritt
Attorney, Agent, or Firm—Patterson & Keough

[57] ABSTRACT

An agricultural implement especially designed to distribute liquid, semi-liquid and solid forms of manure to a field. The manure spreader includes a V-shaped tank and two troughs below the tank. Each trough has an auger disposed in it. Wiper bars are provided to prevent build up of manure on the auger blades. An internal beater breaks up any manure that has bridged over the augers. An external beater, spaced apart from the rear of the tank is adapted to distribute the various forms of manure. A receiver conveys the manure from the troughs to the external beater.

11 Claims, 7 Drawing Sheets

*Fig. 15*

ALL PURPOSE V-SHAPED MANURE SPREADER

TECHNICAL FIELD

This invention relates to improvements in V-shaped manure spreaders used in the hauling and spreading of manure. In particular, it relates to a V-shaped manure spreader having the capability of spreading solid manure as well as spreading conventional V-shaped manure spreader loads of liquid and semi-liquid manure.

BACKGROUND ART

Barnyard manure is an excellent fertilizer. It is common practice for farm operators to dispense the manure in fields in which crops are grown. A variety of manure spreaders have been developed to haul and distribute different types of manure. For instance, conventional box-type spreaders are preferred for handling dry, hard clumps of manure. In such spreaders, the bin for conveying the manure is a relatively wide, shallow box-shaped bin. A moveable conveyer mounted on the bottom of the bin transfers manure to the rear of the bin. Rotating beaters, typically fan or paddle shaped, are mounted at the rear of the bin and distribute the manure in a wide swath to the field.

Box-type spreaders are well suited for the transportation and distribution of solid, clumpy manure, but have not proven effective for distributing liquid or semi-liquid manure. The bins are not sealed, causing leakage of liquid and semi-liquid manure during transportation of the manure to the field. In addition, the broad, flat bottoms of box-type spreaders are not suited for effectively conveying runny liquid and semi-liquid manure to the beaters.

Recent emphasis on the collection and spreading of liquid and semi-liquid manure has led to the development of manure spreaders having top loading V-shaped carrying tanks. V-shaped tanks have steep inwardly angled sides in order to convey the manure to the lowermost portion of the tank. An auger assembly transports the manure rearwardly to side mounted blower assemblies. The blower assemblies distribute the manure from either side of the spreader onto the field in a wide swath.

V-shaped spreaders are well adapted to distribute cattle manure in liquid or slurry forms, as well as swine and poultry manure. Viscous and solid manures, however, are not effectively handled by conventional V-shaped spreaders. The relatively narrow, deep tank of the V-shaped tank causes such manure to form a bridge over the auger, thereby restricting the flow of manure to the auger. Additionally, blowers designed to effectively spray liquid and semi-liquid manure are not generally effective to distribute viscous or solid manure. Moreover, solid viscous manure has an especially sticky consistency. It tends to adhere to manure spreader components and surfaces and may clog the augers. Manure can also contain fibrous plant and vegetable waste material and debris such as stones, straw, and the like. Viscous manure and debris are known to cause the augers to ride up and out of the conveyor troughs in which the augers are designed to operate.

A farm operator currently needs two different manure spreaders in order to be able to effectively distribute all forms of manure. Box-type spreaders, suitable for distributing solid manure, are not well adapted for handling liquid and semi-liquid manure. V-shaped spreaders, while especially suited for handling liquid and semi-liquid manure, become clogged and inoperative when handling viscous and sold manure. A manure spreader of simple design that was capable of effectively distributing liquid, semi-liquid, and solid manure onto a field would present decided advantages.

SUMMARY OF THE INVENTION

The present invention provides a simple, inexpensive, and low maintenance solution to the problems outlined above. The manure spreader hereof includes a V-shaped tank. Two conveyor troughs are positioned at the bottom of the tank, each trough substantially enclosing the lower portion of an auger disposed therein. Two wiper bars are positioned between the two augers. The wiper bars are adjustable laterally so that they may be brought close to the outer edge of the blades of the augers to keep the edges free of manure buildup. In another embodiment, such wipers are fixed in relation to the augers. Outside retainers keep the augers from being forced to the outside away from the wiper bars.

Another feature of the invention is rotatable internal beater, having a longitudinal axis oriented transverse to the longitudinal axes of the augers, positioned in the tank above the augers as an anti-bridging device. A variable opening lift gate is provided at the rear of the tank enabling operator control of the rate of distribution of the manure. The lift gate has sealing plates incorporated on it to minimize leakage of manure.

A bladed external beater is provided spaced apart from and to the rear of the tank. The blades of the external beater, in conjunction with the receiver beneath the beater, provide for the distribution of liquid, semi-liquid, or solid manure in a wide swath. The receiver provides means to convey the manure to the external beater, which is spaced apart from the rear of the tank. A retractable clean out door is provided beneath and at the rear of the conveyor troughs. In the forwardmost, retracted position, the rearwardmost edge of the clean out door is flush with the rear of the conveyor troughs. The clean out door between the rear of the conveyor troughs and the receiver provides for clean out of the manure spreader. In its fully rearward extended position, the clean out door bridges the gap between the rear of the conveyor troughs and the receiver, whereby the manure flows to the receiver for distribution by the external beater to the field.

DETAILED DESCRIPTION OF THE DRAWINGS

Referring to the drawings, a manure spreader 14 in accordance with the present invention broadly includes main frame 15, V-shaped tank 16, ground engaging wheels 20, and tractor connecting tongue 24.

Frame 15 supports V-shaped tank 16. Frame 15 is in turn supported by axle 18 and wheels 20. A hitch 22, carried by tongue 24, provides for detachable coupling of the manure spreader 14 to the draw bar of a tractor (not shown). Shaft coupling assembly 26 is adapted for connection to the power take-off shaft (not shown) of the tractor. Hydraulic hoses 28 are adapted for connection to the hydraulic power take-off of the tractor. Hydraulic power is provided to hydraulic power distributor 30 and thence to a hydraulic motor and actuators as needed.

Figure 1:
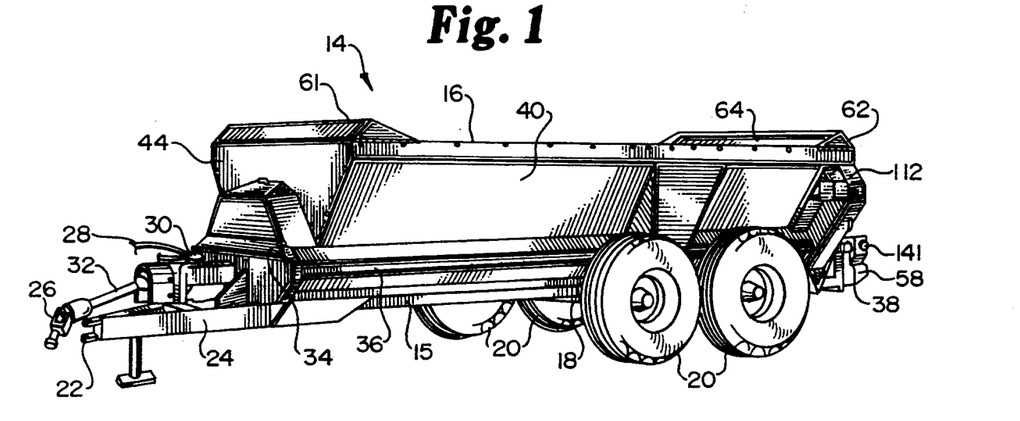
FIG. 1 is a perspective view of a V-shaped manure spreader in accordance with the present invention.
Figure 2:
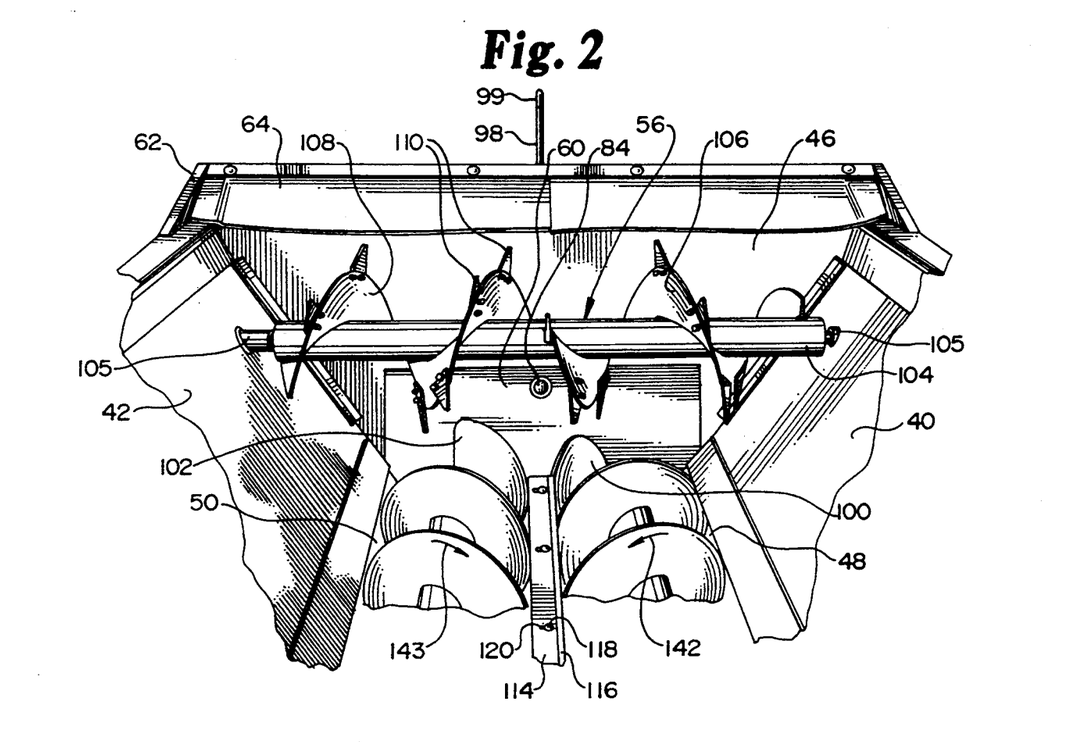
FIG. 2 is an enlarged, rearward-looking, perspective view of the interior of the manure spreader depicted in FIG. 1, depicting the wiper bars, splash guard, interior beater assembly, augers and lift gate.

Power distribution systems to provide power to the various mechanisms of manure spreader 14 are generally concealed behind protective covers in the preferred embodiment. Shaft 32, driven by the tractor power takeoff, is connected to a chain and sprocket drive unit (not shown) located behind cover 34. The drive unit rotates a drive shaft 38 that is protected by cover 36. The drive shaft extends to the rear of manure spreader 14, the end portion of the drive shaft 38 being depicted in FIG. 1. Hydraulic power is transferred via hoses (not shown) from hydraulic distributor 30 to a hydraulic motor (not shown) located behind cover 34.

V-shaped tank 16 includes left and right, inwardly inclined sidewalls 40, 42, front wall 44, and rear wall 46. V-shaped tank 16 includes lowermost conveyor troughs 48, 50, each having an auger 52, 54 carried therein. Internal beater 56 is supported in tank 16, above augers 52, 54. External beater assembly 58 is carried by frame 15, mounted rearward of tank 16.

Front wall 44 supports the various drive mechanisms (not shown) that are protected by cover 34. Front bonnet 61 extends along the top margin of front wall 44.

Rear wall 46 includes variable lift gate 60. Lift gate 60 is preferably a flat rectangular plate. In its closed position, the lower portion of lift gate 60 forms a rear end seal for conveyor troughs 48, 50. Rear bonnet 62 extends along the top margin of rear wall 46. Splash guard 64 is affixed along one edge to the upper margin of rear bonnet 62. Splash guard 64 is preferably formed from a flexible material, such as rubber.

Figure 4:
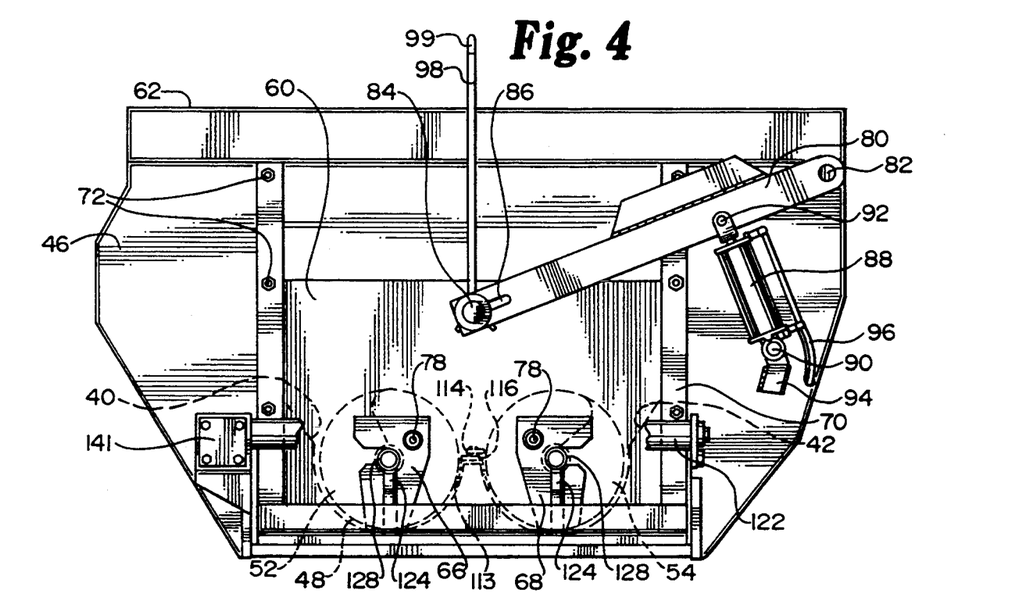
FIG. 4 is a rear elevational view of the manure spreader, with the rear beater removed for clarity, and with phantom lines depicting the augers and wiper bars, the lift gate being depicted in the closed position.
Figure 5:
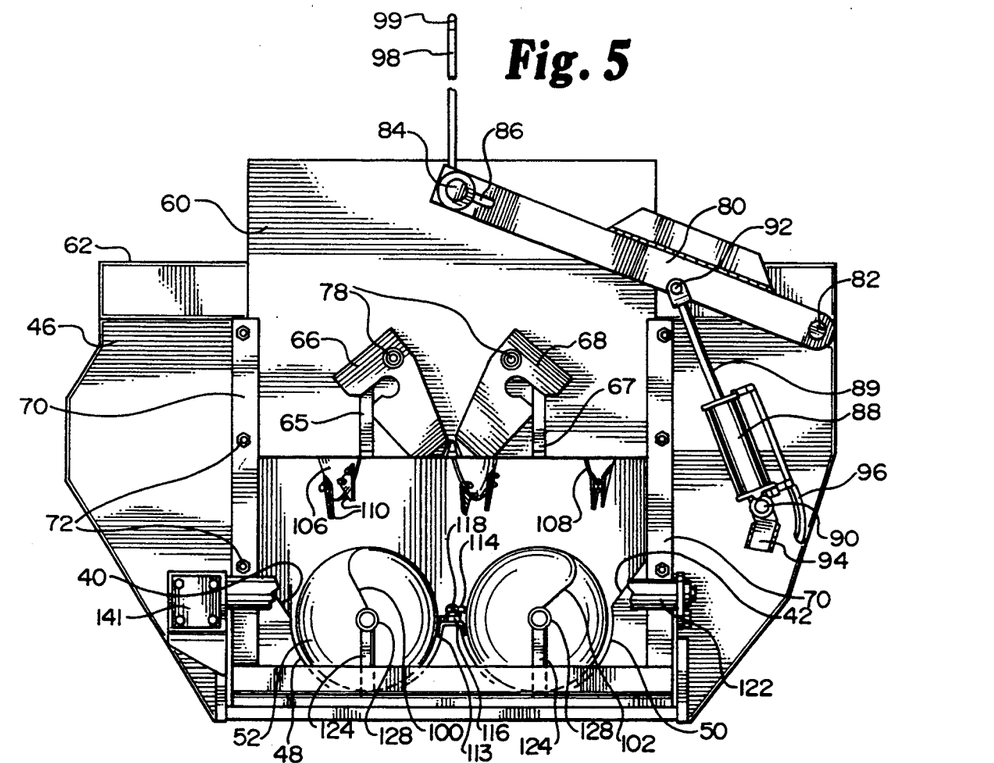
FIG. 5 is similar to FIG. 4, but with the lift gate depicted in the open position.

FIGS. 4 and 5 depict the lift gate 60 in its closed and open positions respectively. The gate 60 includes lowermost, auger receiving slots 65, 67. Sealing plates 66, 68 are pivotally carried by the external face of gate 60. Lift gate 60 is mounted to rear wall 46 by flanges 70. Flanges 70 are in turn mounted to rear wall 46 by bolts 72. Flanges 70 are conventionally designed to permit lift gate 60 to freely slide up and down within flanges 70.

Figure 7:
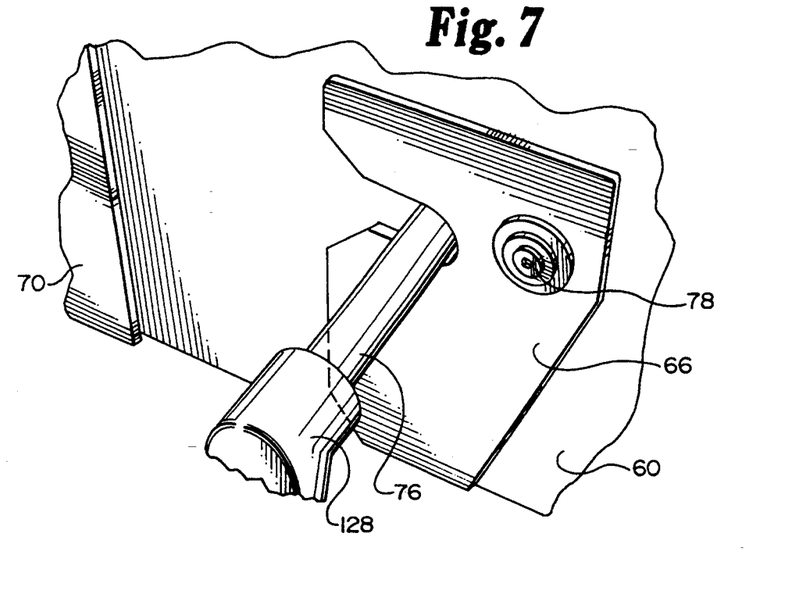
FIG. 7 is an enlarged, fragmentary, perspective view of the lift gate depicting a sealing plate in the closed position.
Figure 8:
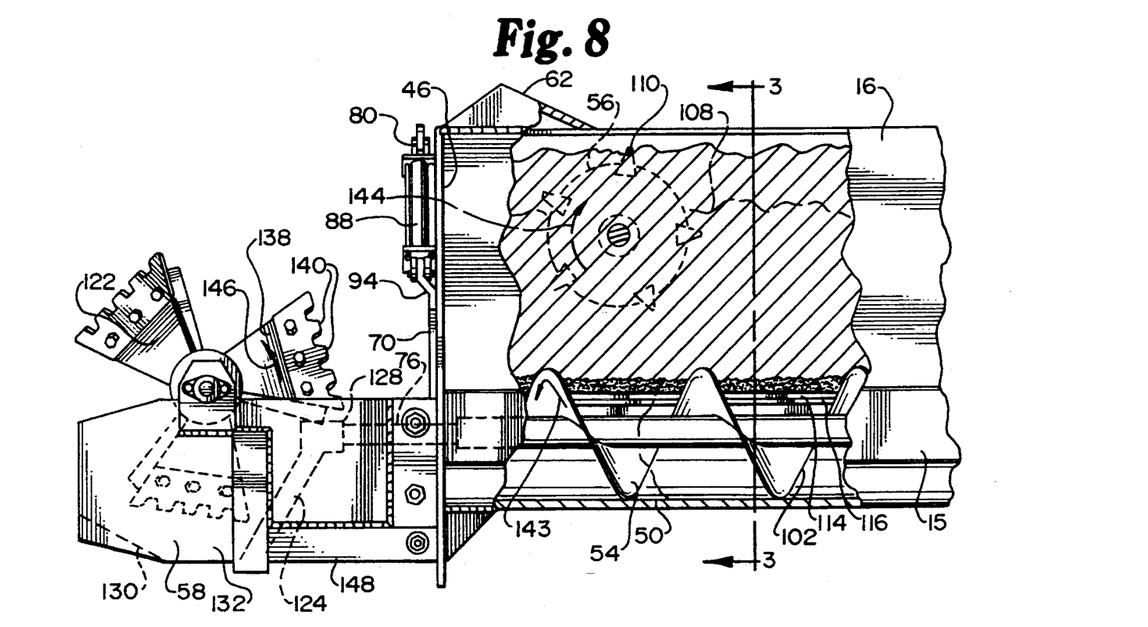
FIG. 8 is a fragmentary, side elevational view of the manure spreader.

Slots 65, 67 receive the rear ends of auger shafts 76. Referring to FIG. 5, sealing plates 66, 68 are affixed to gate 60 by pins 78 and are free to rotate about pins 78 in a plane parallel to lift gate 60. Sealing plate 66 is depicted in FIG. 7 as closed around auger shaft 76, when lift gate 60 is in its fully closed position.

Lever arm 80 is pivotally coupled at a first end to rear wall 46 by pin 82. Lever arm 80 is affixed at a second end to gate 60 by pivot pin 84. Pin 84 passes through a racetrack slot 86 in lever arm 80, thereby enabling lever arm 80 to both rotate about pin 84 and to translate longitudinally with respect to pin 84.

Hydraulic actuator 88 has rotatable couplings 90, 92, one at either end of actuator 88. Rotatable coupling 90 is affixed to rear wall 46 by mount 94. Rotatable coupling 92 is affixed to lever arm 80 at a point between the first and second ends of lever arm 80. Hydraulic actuator 88 is connected to hydraulic power distributor 30 by hydraulic lines 96. Hydraulic actuator 88 is depicted in its fully retracted position in FIG. 4, and is depicted in its fully extended position in FIG. 5.

Visual indicator 98 is fixedly carried by lift gate 60. Indicator 98 comprises a rod preferably having its upper tip 99 painted with a highly visible color to assist in visually determining the relative height of tip 99 with respect to the top of rear wall 46.

Augers 52, 54 each include a spiraled, continuous auger blade 100, 102. A flighting is a 360° revolution of the spiral auger blades 100, 102. A plurality of flightings of the spiral blades 100, 102 are included over the full length of augers 52, 54. The flightings of the auger blades 100, 102 are opposite handed with respect to one another. Augers 52, 54 are powered by a hydraulic motor (not shown) through a conventional sprocket and chain drive system and are counter-rotating. Direction of rotation is as indicated by arrows 142, 143.

Figure 3:
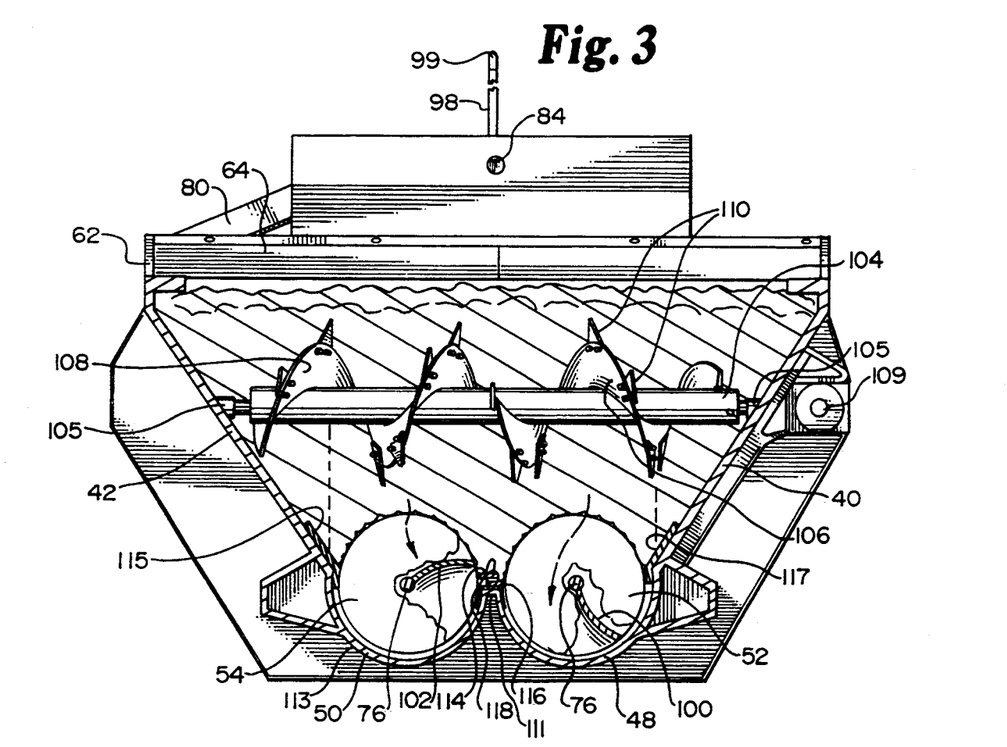
FIG. 3 is a sectional view taken along line 3—3 of FIG. 8.
Figure 14:
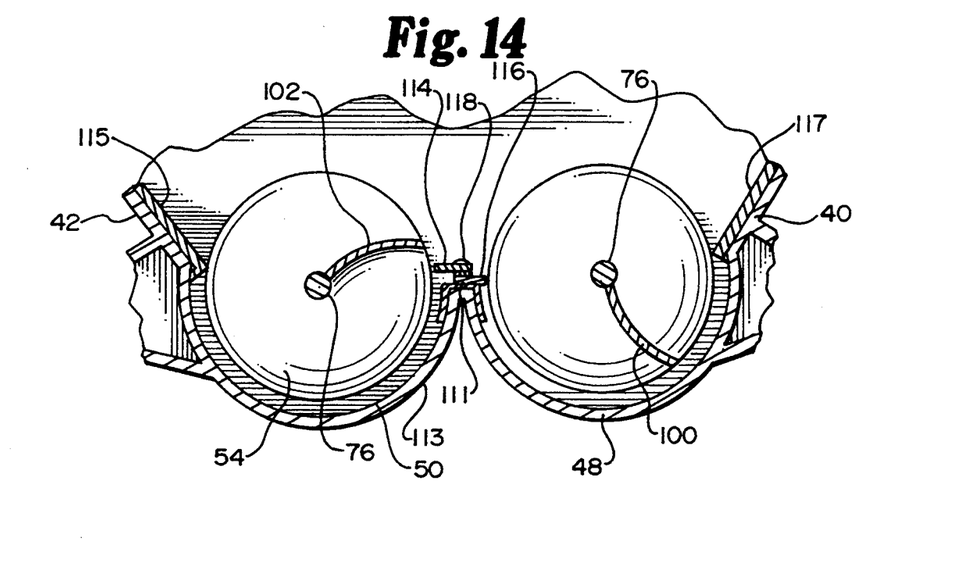
FIG. 14 is a fragmentary view of the augers and wiper bars.
Figure 15:
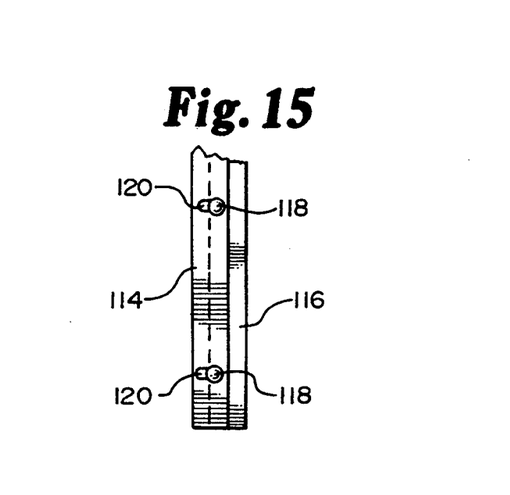
FIG. 15 is a enlarged, fragmentary, top perspective view of the wiper bars.

Wiper bars 114, 116 are supported between augers 52, 54 and have longitudinal axes substantially parallel with the longitudinal axes of augers 52, 54. Wiper bar 114 overlies wiper bar 116. Bolts 118 pass through overlying racetrack-shaped slots 120 in wiper bars 114, 116 and are threaded into the bar supporting structure 113 of conveyor troughs 48, 50. Referring to FIG. 3, the bar supporting structure 113 positions the wiper bars 114, 116 approximately even in height with auger shafts 76, and includes a generally planar support surface 111 extending between the two conveyor troughs 48, 50. The racetrack-shaped slots 120 have sufficient lateral dimension to permit wiper bars 114, 116 to be moved laterally to abut the outer edge of either auger blade 100, 102, as desired. As depicted in FIG. 14, wiper bar 114 is adjusted to abut spiral blade 102 and wiper bar 116 is adjusted to abut spiral blade 100.

In an alternative embodiment, wiper bars 114, 116 are fixed in close proximity to auger blades 100, 102. In the manufacturing process, the outer edges of auger blades 100, 102 are trimmed so that augers 52, 54 rotate freely in close proximity to wiper bars 114, 116.

Outside retainers 117, 115 are affixed at the intersection of sidewalls 40, 42 and conveyor troughs 48, 50. Retainers 117, 115 are positioned close to auger blades 100, 102. Retainers 117, 115 run the full length of augers 52, 54 and may be constructed of suitable bar stock such that retainers 117, 115 will be able to accommodate the rotational contact of auger blades 100, 102.

Internal beater 56 is mounted transverse to the longitudinal axis of manure spreader 14. It is mounted toward the rear of V-shaped tank 16, spanning between left sidewall 40 and right sidewall 42, above augers 52, 54. Internal beater 56 includes longitudinal axial shaft 104. The shaft 104 has jouraled ends rotatably received within fittings 105. Helical blades 106, 108 are affixed to shaft 104. The flightings of blades 106, 108 are opposite handed with respect to one another. Spikes 110 are affixed at suitable intervals along the outer edge of helical blades 106, 108. Internal beater 56 rotates as indicated by arrow 144. In an alternative embodiment that is not shown, internal beater 56 is constructed with segmented blades instead of helical blades 106, 108. The segmented blades have opposite orientation on either side of the centerline of the tank such that as internal beater 56 is rotated, the blades tend to force the manure inward and downward.

Shaft 104 extends through left tank sidewall 40. A drive unit 109, comprising a sprocket or other drive mechanism, is drivingly coupled to the shaft 104. Protective cover 112 encloses the drive unit.

Figure 6:
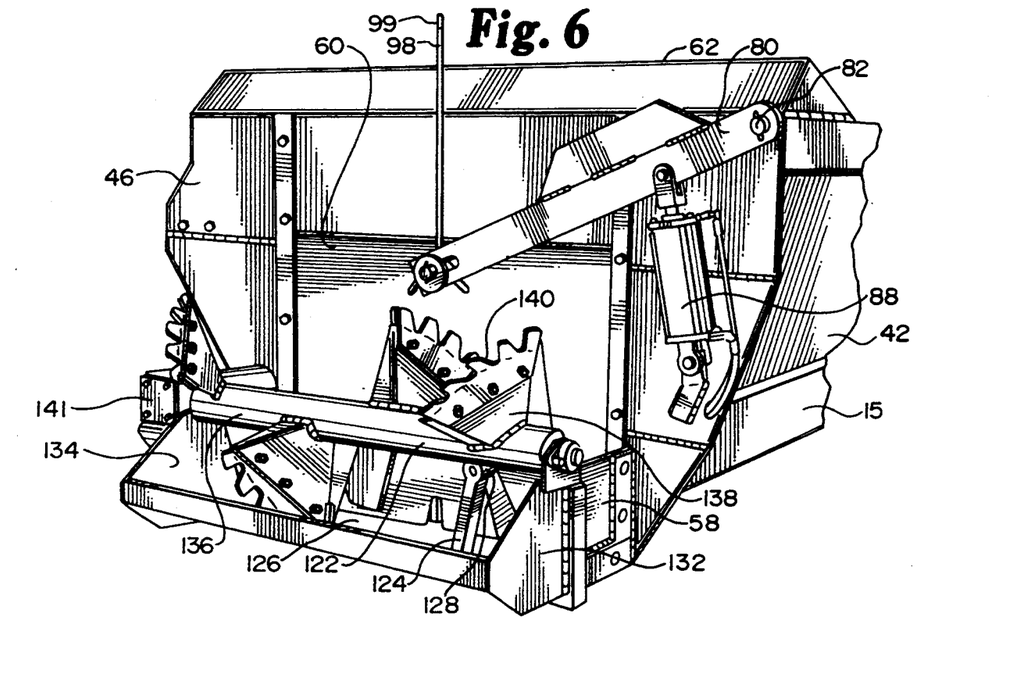
FIG. 6 is a rear perspective view of the spreader.

Referring to FIG. 6, external beater assembly 58 is carried by frame 15 rearwardly of V-shaped tank 16. External beater assembly 58 includes external beater 122, supports 124 for augers 52, 54 and the receiver 126. The ends of auger shafts 76 are carried in bearings inside bearing housings 128. Bearing housings 128 are mounted on supports 124. A first end of each support 124 is affixed to receiver 126. Supports 124 are tilted forwardly such that bearing housings 128 are positioned forward of external beater 122.

Receiver 126 is comprised of bottom panel 130 and side panels 132, 134 and extends forward to the rearmost portion of conveyor troughs 48, 50. The bottom panel 130 is preferably curved upward at its rearmost edge, having a radius that is slightly greater than the radius of beater blades 140 of beater 122. Receiver 126 effectively forms a chute to convey manure from conveyor troughs 48, 50 to external beater 122, which is spaced apart from rear wall 46.

Gap 135 is formed between the forward edge of bottom panel 130 and the rearmost portion of conveyor troughs 48, 50. The gap 135 extends laterally the full width of receiver 126, from side panel 132 to side panel 134.

Figure 9:
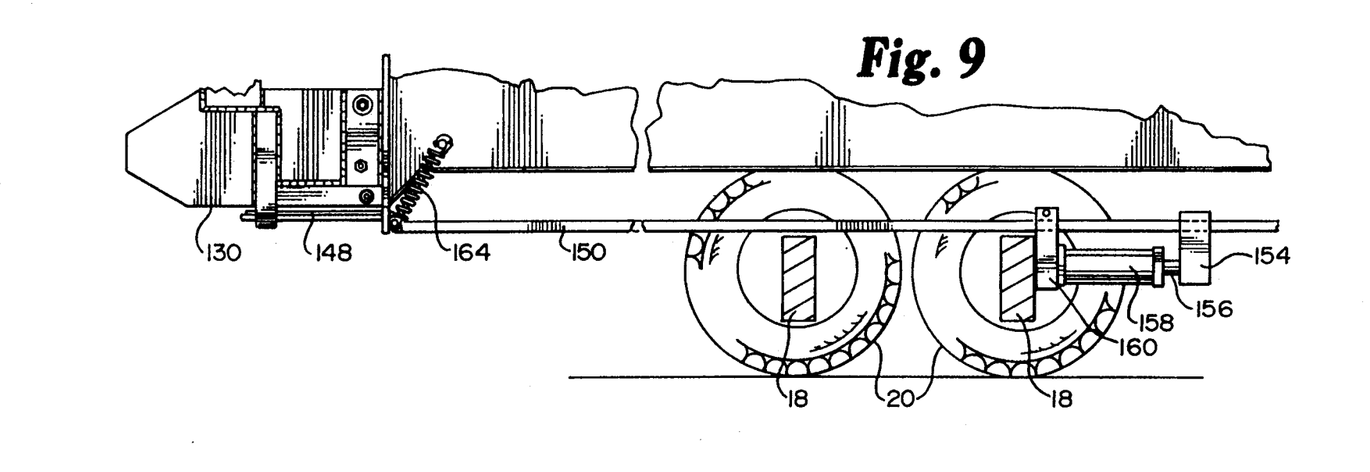
FIG. 9 is a fragmentary, right side elevational view of the lower portion of the manure spreader depicting the connecting panel in its extended, closed position.
Figure 10:
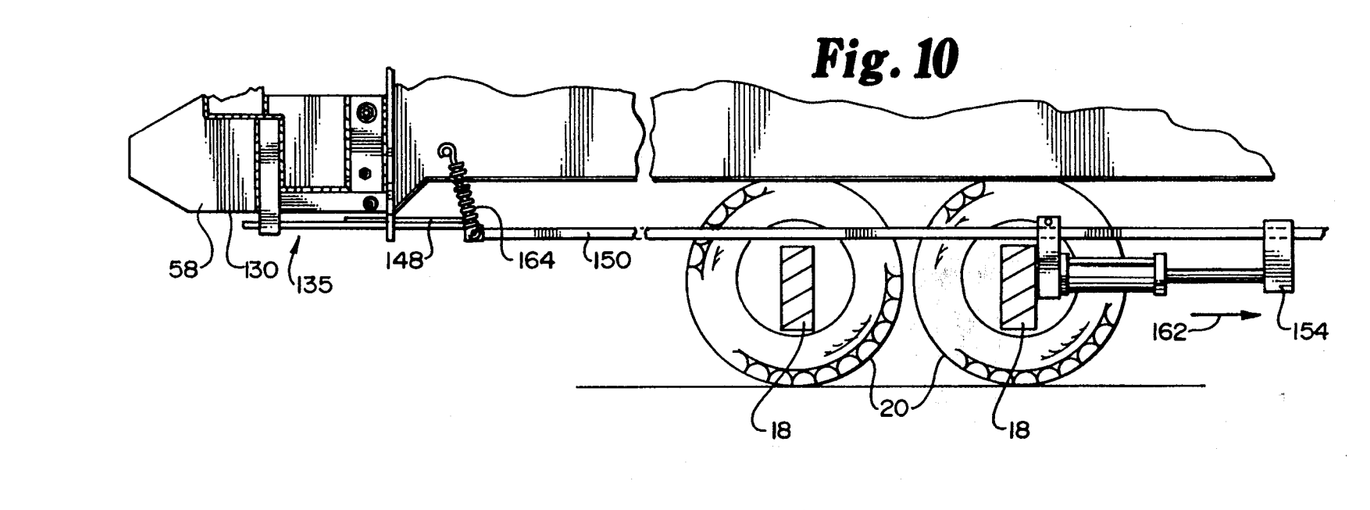
FIG. 10 is similar to FIG. 9, but with the connecting panel depicted in its retracted, open position.
Figure 11:
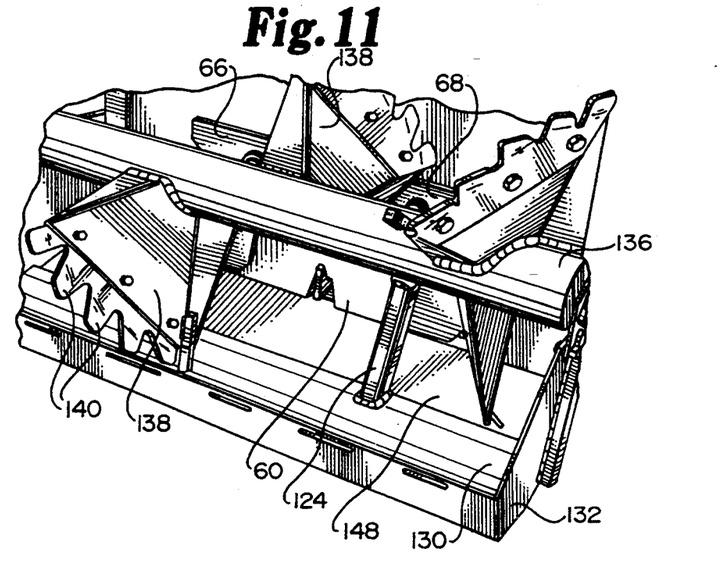
FIG. 11 is enlarged, fragmentary, perspective view depicting the connecting panel view in its closed position.

Moveable clean out door 148 is disposed beneath conveyor troughs 48, 50. In FIG. 9, clean out door 148 is depicted in its rearwardly disposition, closing the gap 135 between conveyor troughs 48, 50 and bottom panel 130. In this embodiment, clean out door 148 effectively forms the forwardmost portion of bottom panel 130. FIG. 10 depicts clean out door 148 forwardly position, opening the gap 135 between conveyor troughs 48, 50 and bottom panel 130.

Clean out door 148 is actuated hydraulically by hydraulic actuator 158. Hydraulic actuator 158 is carried beneath conveyor troughs 48, 50 and is supported by bracket 160, attached to axle 18. Piston 156 is disposed within hydraulic actuator 158 and oriented to produced motion forwardly and rearwardly as indicated by arrow 162. Piston 156 is connected to a first end of link 154. A second end of link 154 is connected to a first end of rod 150. The connections to link 154 are rigid such that forward and rearward motion of piston 156 produces the same motion in rod 150. Rod 150 is slideably supported by guide 160 and the second end of rod 150 is joined to connecting panel 148. Spring 164 holds clean out door 148 in upward tension.

Figures 12, 13:
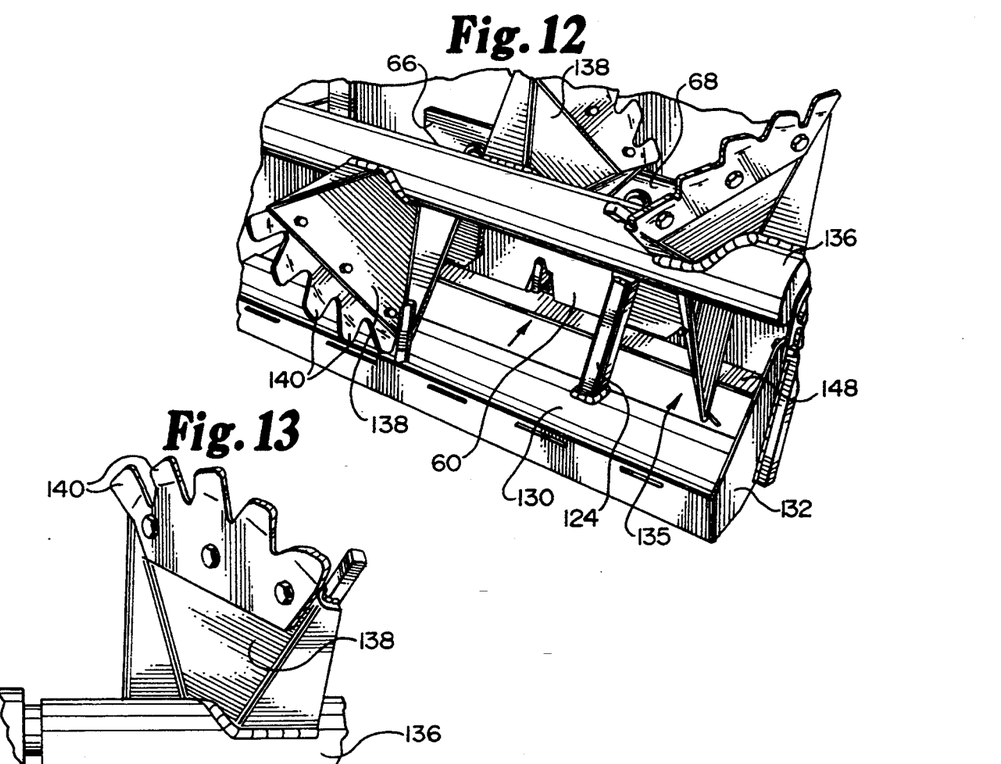
FIG. 12 is similar to FIG. 11, but with the connecting panel in its open position.
FIG. 13 is an enlarged, fragmentary view of the external beater depicting a paddle and teeth.

External beater 122 is spaced apart from rear wall 46 and is comprised of a longitudinal axial shaft 136, a plurality of beater blades 138 affixed to the axial shaft 136, and a plurality of teeth 140 disposed on the beater blades 138. In the embodiment depicted in the drawings, external beater 122 has three pairs of beater blades 138 carried by shaft 136. A series of teeth 140 are affixed at the outer radius of each blade 138. Teeth 140 are bent outward with respect to the blade 138 on which teeth 140 are disposed. Effectively, there are three beater blades 138 to each side of the centerline of V-shaped tank 16. The teeth 140 on the blades 138 that are left of centerline are bent to the left with respect to the blades 138 on which they are mounted. The teeth 140 on the blades 138 that are right of centerline are bent to the right with respect to the blades 138 on which they are mounted. This orientation of teeth 140 is depicted in FIG. 13, which depicts a left of center beater blade 138. External beater 122 is powered mechanically in a conventional manner through drive unit 141 and rotates as indicated by arrow 146.

In operation, manure spreader 14 is loaded with manure through the open top. Prior to loading, shaft coupling assembly 26 is connected to the tractor power takeoff and hydraulic hoses 28 are connected to the tractor hydraulic takeoff, providing rotary mechanical and hydraulic power to manure spreader 14. Wiper bars 114, 116 are adjusted to abut the outer edge of auger blades 102, 100 by loosening bolts 118 and, for example, moving wiper bar 114 laterally to the right to abut auger blade 102 of auger 54 and moving wiper bar 116 to the left to abut auger blade 100 of auger 52. Retightening bolts 118 ensures that wiper bars 114, 116 are held set in the desired position. When so positioned, the wiper bars 114, 116 act to keep augers 52, 54 free of manure buildup.

In normal operation augers 52, 54 rotate freely in conveyor troughs 48, 50. It is desirable to keep augers 52, 54 in close proximity to wiper bars 116, 114 so that wiper bars 116, 114 can prevent long straw type material from rotating with auger 52, 54. Such material, when in rotation with augers 52, 54, requires extreme power to keep augers 52, 54 in rotation. Wiper bars 116, 114 act in concert with outside retainers 117, 115 to keep augers 52, 54 in conveyor troughs 48, 50. The rotation of augers 52, 54 through manure tends to force augers 52, 54 upward and to the outside of conveyor troughs 48, 50. Retainers 117, 115 act on auger blades 100, 102, keeping augers 48, 50 down and in contact with wiper bars 116, 114. As augers 52, 54 ride upward and outward, auger blades 100, 102 make rotational contact with outside retainers 117, 115. In this condition, outside retainers function as stops, physically retaining augers 52, 54 in conveyor troughs 48, 50.

Lift gate 60 is closed prior to loading. The operator, by ascertaining the relative height of indicator 98, is able to determine the position of lift gate 60. If open, lift gate 60 is shifted to the closed position by hydraulic actuator 88 retracting piston rod 89, pulling down on lever arm 80. As lift gate 60 nears its closed position, slots 65, 67 slide over auger shafts 76. Auger shafts 76 ultimately strike sealing plates 66, 68 that overlies slots 65, 67. As lift gate 60 continues to descend, auger shafts 76 continue to ride on the indentations in sealing plate 66, 68, causing sealing plates 66, 68 to rotate to a closed position, thereby sealing off slots 65, 67.

Front bonnet 61, disposed along the top margin of front wall 44, and rear bonnet 62 restrain manure carried within tank 16 from splashing over the ends of tank 16. Liquid and semi-liquid manure, in particular, tend to slosh back and forth during transportation. Bonnets 61, 62 direct the manure back into tank 16 as it sloshes up against front wall 44 and rear wall 46.

Distribution of manure is initiated by opening lift gate 60. Lift gate 60 is raised by hydraulic actuator 88 exerting upward force on lever arm 80, which in turn raises lift gate 60. As lift gate 60 is raised, the lower, rounded portion of the indentation in sealing plates 66, 68 is forced against the underside of auger shafts 76. Sealing plates 66, 68 are accordingly pivoted to the open position. The rate at which the manure is distributed from the tank can be controlled by changing the height to which gate 60 is lifted and controlling speed of augers 52, 54. Prior to opening gate 60, the connecting panel 148 is shifted to its rearwardmost position and augers 52, 54, internal beater 56, and external beater 122 are rotationally engaged by the operator.

In a preferred embodiment, augers 52, 54 are powered by a variable speed hydraulic drive varying the speed of the augers 52, 54 compensating for varying ground speeds of manure spreader 14. In this way, the amount of manure deposited on the field can be maintained as desired over a wide range of ground speeds. Additionally, the hydraulic drive is reversible. An obstruction in the augers 52, 54 such as a stone or piece of wood, may be cleared by reversing the direction of rotation of the augers 52, 54.

Manure that has been gravity fed into the augers 52, 54 is transported rearwardly by the rotary action of the auger blades 100, 102. Manure is forced across connector panel 148 to receiver 126. Wiper bars 114, 116 continually clean auger blades 100, 102 as auger blades 100, 102 rotate past wiper bars 114, 116, thereby preventing clogging of augers 52, 54 and eliminating the tendency of augers 52, 54 to ride up and out of conveyor troughs 48, 50.

Internal beater 56 rotates above augers 52, 54. Spikes 110 act to break up manure that has formed a bridge over augers 52, 54. The rotary action of helical blades 106, 108, being opposite handed, tends to pull the manure inwardly away from side walls 40, 42, narrowing the manure load and moving it to the center of tank 16. The manure is forced downwardly at the center to augers 52, 54 and rearward to expel the manure out the opening made by raised lift gate 60. Splash guard 64 acts to minimize the amount of manure splashing out of manure spreader 14 when internal beater 56 is in operation. An effect of internal beater 56 is that, as it breaks a manure bridge in its location, the breaking action proximate internal beater 56 causes a ripple effect that results in the collapse of bridges that have formed forward of internal beater 56. This results in feeding of manure to augers 52, 54 along their full length. It has been found that a rotational speed of approximately 305 RPM for internal beater 56 keeps internal beater 56 cleaned out when the load in manure spreader 14 is heaped.

Unlike blowers mounted on the rear of conventional V-shaped manure spreaders, external beater 122 is spaced apart from rear wall 46 of tank 16. Receiver 126 is effective to convey all forms of manure, including liquid, from conveyor troughs 48, 50 to external beater 122. Side panels 132, 134 combined with bottom panel 130 being curved upward at its rearmost edge, make a substantially leak proof means of conveyance of manure to external beater 122.

External beater 122 is effective to handle all forms of manure. Manure is forced onto curved bottom panel 130 of receiver 126, placing the manure proximate to beater blades 138. As external beater 122 rotates, beater blades 138 pick up the manure and distribute it to the field. The outward bend of teeth 140 effectively hooks the manure and picks it up so that it can be delivered to the field. The twist that is imparted to teeth 140 generates a more even swath of manure distribution. Distribution of manure out the sides of manure spreader 14 is facilitated by the low profile of side panels 132, 134 of receiver 126. External beater 122 is able to pick the manure up and deliver it sideways over the tops of side panels 132, 134 to the field. It has been found that a rotational speed of approximately 540 RMP for external beater 122 produces a reasonably wide pattern spread without throwing the manure so high that it is picked up and dispersed by the wind.

Cleaning of tank 16 is facilitated by clean out door 148. FIG. 9 depicts clean out door 148 in its rearwardmost position as selected for the distribution of manure. Cleaning of tank 16 is accomplished by retracting clean out door 148 to its forwardmost position thereby opening the gap 135 between conveyor troughs 48, 50 and receiver 126. Opening lift gate 60 and rotationally engaging augers 52, 54 conveys any manure remaining in tank 16 rearward and expels the manure through the gap 135 onto the ground.

A problem may exist when lift gate 60 is closed on manure that has straw or the like embedded in it. The closing of lift gate 60 on such manure would wedge clean out door 148, jamming it such that it could not be extended or retracted. Incorporating spring 164 in the mechanism provides the capability of preventing such jamming. The downward pressure of the manure overcomes the spring tension of spring 164 and deflects clean out door 148 downward. In such condition, clean out door 148 may be hydraulically retracted or extended. When the jam is cleared, the spring tension of spring 164 will return clean out door 148 to its upwardmost position.

What is claimed is:

1. An agricultural implement for transporting and spreading manure, having a tank for holding the manure, the tank having a discharge end, an opposed end, a pair of inwardly and downwardly sloped sidewalls therebetween, and a lowermost conveyor trough, comprising;

auger means rotatably carried within the conveyor trough for directing manure through the conveyor trough towards the tank discharge end, the auger means including a first auger member having a first auger member rotatable longitudinal shaft and a generally spiral first auger member blade for rotation therewith including a first auger member inner blade edge operably coupled to the first auger member shaft and a first auger member outer blade edge presenting a first auger member outer circumference;

wiper means comprising a first elongated wiper bar extending generally parallel to said first auger member longitudinal shaft; and wiper mounting means for adjustably mounting the wiper bar adjacent the auger means in operable, adjustable wiping engagement with the first auger member spiral blade, whereby said wiper bar can be adjustably, laterally shifted into wiping engagement with said first auger member outer blade edge for regulating the buildup of manure on the first auger member as it rotates in the conveyor trough.

2. The invention as claimed in claim 1, including retainer means adapted for keeping said auger means in operable wiping engagement with said wiper means, said retainer means comprising a first elongated bar extending generally parallel to said first auger member longitudinal shaft, said first elongated bar operably disposed with respect to said first auger member to resist the tendency of said first auger member to ride up and out of the conveyor trough when said first auger member is in rotation.

3. The invention as claimed in claim 1, said first auger member spiral blade including a plurality of flightings, said first elongated bar extending across at least two of said flightings.

4. The invention as claimed in claim 1, said auger means including a second auger member oriented generally parallel to said first auger member in generally side to side relationship therewith, said second auger member including a second auger member rotatable longitudinal shaft and a generally spiral second auger member blade for rotation therewith including a second auger member inner blade edge operably coupled to the second auger member shaft and a second auger member outer blade edge presenting a second auger member outer circumference, said wiper means comprising a second elongated bar extending generally parallel to said second auger member longitudinal shaft, said wiper mounting means including means for mounting said second elongated bar in operable wiping engagement with the second auger member outer blade edge.

5. The invention as claimed in claim 4, said second auger member spiral blade including a plurality of flightings, said second elongated bar extending across at least two of said flightings.

6. The invention as claimed in claim 4, said mounting means including means for laterally adjusting said first and second elongated bars into wiping engagement with said first and second auger members respectively.

7. The invention as claimed in claim 4, including retainer means adapted for keeping said auger means in operable wiping engagement with said wiper means, said retainer means including a first elongated bar extending generally parallel to said first auger member longitudinal shaft and a second elongated bar extending generally parallel to said second auger member longitudinal shaft, said first elongated bar operably disposed with respect to said first auger member and said second elongated bar operably disposed with respect to said second auger member to resist the tendency of said first auger member and said second auger member to ride up and out of the conveyor trough when said first auger member and said second auger member are in rotation.

8. The invention as claimed in claim 1, including internal beater means operably rotatably carried by the sidewalls of the tank transverse to the first auger member longitudinal shaft for agitating manure within the tank and moving the manure inwardly and downwardly in the tank.

9. An agricultural implement for transporting and spreading manure over a field, comprising;
   a manure receiving tank having a front wall, an opposed rear wall and a pair of inwardly and downwardly sloped sidewalls extending between said front wall and said rear wall, and a tank bottom wall extending between said sloped sidewalls to present a tank bottom width extending between said sloped sidewalls;
   a pair of augers rotatably carried within the tank adapted for directing manure towards the tank rear wall, said pair of augers being aligned generally side by side along said tank bottom wall to present a combined auger width extending generally across said tank bottom width;
   gate means operably carried by said rear wall for selectively releasing said manure from said tank, said gate means presenting a spreader discharge width, said spreader discharge width being at least as wide as said combined auger width;
   an external beater oriented rearwardly of and spaced apart from said rear wall, said beater having a generally horizontally disposed beater longitudinal axis oriented generally orthogonal to said pair of augers and flighting elements extending along said longitudinal axis adapted for spreading said manure over said field in a swath having a width wider than said spreader discharge width; and
   receiver means extending generally between said gate means and said external beater for conveying manure from said gate means into spreading engagement with said external beater.

10. The invention as claimed in claim 9, said receiver means including a moveable member selectively shiftable between a closed position wherein said receiver means provides a generally continuous path for said manure between said gate means and said external beater and an open position wherein said receiver means presents a gap between said gate means and said external beater wherein manure discharged through said gate means is expelled from said receiver means clearing said external beater.

11. The invention as claimed in claim 9, including an internal beater operably rotatably carried by the sidewalls of the tank transverse to the augers for agitating manure within the tank and moving the manure inwardly and downwardly in the tank.

* * * * *